(12) United States Patent
Lee et al.

(10) Patent No.: US 8,540,437 B2
(45) Date of Patent: Sep. 24, 2013

(54) MULTI-WAVELENGTH OPTICAL TRANSMITTING AND RECEIVING MODULES

(75) Inventors: Joon Ki Lee, Daejeon-si (KR); Sae-Kyoung Kang, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 437 days.

(21) Appl. No.: 12/835,246

(22) Filed: Jul. 13, 2010

(65) Prior Publication Data

US 2011/0058771 A1  Mar. 10, 2011

(30) Foreign Application Priority Data

Sep. 7, 2009  (KR) .................. 10-2009-0084153
Nov. 30, 2009  (KR) .................. 10-2009-0116985

(51) Int. Cl.
 *G02B 6/36* (2006.01)
 *G02B 6/32* (2006.01)

(52) U.S. Cl.
 USPC .......... 385/93; 385/31; 385/33; 385/47; 385/88; 385/89; 385/92

(58) Field of Classification Search
 USPC ........................................... 385/33, 93
 See application file for complete search history.

(56) References Cited

U.S. PATENT DOCUMENTS

| 6,198,864 | B1 * | 3/2001 | Lemoff et al. .......... 385/47 |
| 6,201,908 | B1 | 3/2001 | Grann |
| 6,571,033 | B2 | 5/2003 | Caracci et al. |
| 6,769,816 | B2 | 8/2004 | Capewell et al. |
| 6,870,976 | B2 | 3/2005 | Chen et al. |
| 7,184,621 | B1 | 2/2007 | Zhu |
| 7,258,494 | B2 | 8/2007 | Park et al. |
| 7,532,826 | B2 * | 5/2009 | Zhu et al. .......... 398/212 |
| 8,036,533 | B2 | 10/2011 | Hosomi et al. |
| 2004/0208452 | A1 | 10/2004 | Kropp |
| 2006/0088255 | A1 | 4/2006 | Wu et al. |
| 2008/0175591 | A1 * | 7/2008 | Yu et al. .......... 398/65 |

FOREIGN PATENT DOCUMENTS

| EP | 1553433 A1 | 7/2005 |
| JP | 10-107387 | 4/2009 |
| KR | 10-0640421 A | 7/2006 |
| KR | 2009-0040860 A | 4/2009 |

* cited by examiner

*Primary Examiner* — Ryan Lepisto
(74) *Attorney, Agent, or Firm* — Rabin & Berdo, P.C.

(57) ABSTRACT

A multi-wavelength optical transmitting module includes a housing, an optical output block, an optical transmitting block, and an optical multiplexer (MUX) block. The optical output block is coupled to a first coupling hole of the housing and to an optical signal connector, and includes a first lens. The optical transmitting block is coupled to a second coupling hole of the housing and to an electrical signal connector. The optical transmitting block includes a plurality of transmitting devices which respectively output light having different wavelengths and are arranged parallel to the optical output block, and a plurality of second lenses which correspond respectively to the transmitting devices. The optical multiplexer (MUX) block multiplexes optical signals of multiple wavelengths, which were output from the transmitting devices and passed through the second lenses, and transmits the multiplexed optical signals to the optical output block.

4 Claims, 9 Drawing Sheets

MULTI-WAVELENGTH OPTICAL TRANSMITTING AND RECEIVING MODULES

CROSS REFERENCE TO RELATED APPLICATION

This application claims the benefit under 35 U.S.C. §119(a) of Korean Patent Applications No. 10-2009-84153, filed on Sep. 7, 2009 and No. 10-2009-116985, filed on Nov. 30, 2009, the disclosures of which are incorporated by reference in its entirety for all purposes.

BACKGROUND

1. Field

The following description relates to multi-wavelength optical transmitting and receiving modules which can be used to multiplex and demultiplex optical signals of multiple wavelengths.

2. Description of the Related Art

An increase in data traffic resulting from the advancement of the Internet is increasing the speed and volume of optical communication networks. For transmission of high-volume data traffic, wavelength division multiplexing (WDM) is widely used. WDM is a technology that multiplexes optical signals having different wavelengths on a single optical fiber. WDM has been used mainly in backbone networks but has also been applied in access loop networks and Ethernet networks.

In the case of 40 gigabit (G) Ethernet, 10 G×4 channel coarse wavelength division multiplexing (CWDM) has been adopted as a standard for transmission over a 10 km single-mode fiber. In the case of 100 G Ethernet, 25 G×4 channel local area network (LAN)-WDM has been adopted as a standard for transmission over a 10 km or 40 km single-mode optical fiber.

In 40 G and 100 G Ethernet, an optical transmitting and receiving module multiplexes four channels and transmits the multiplexed channels. Key parts of the optical transmitting and receiving module include a transmitter optical sub-assembly (TOSA) and a receiver optical sub-assembly (ROSA). The TOSA performs electrical-optical conversions of four channels and wavelength multiplexing, and the ROSA performs wavelength demultiplexing and optical-electrical conversion of the four channels.

Figure 1:
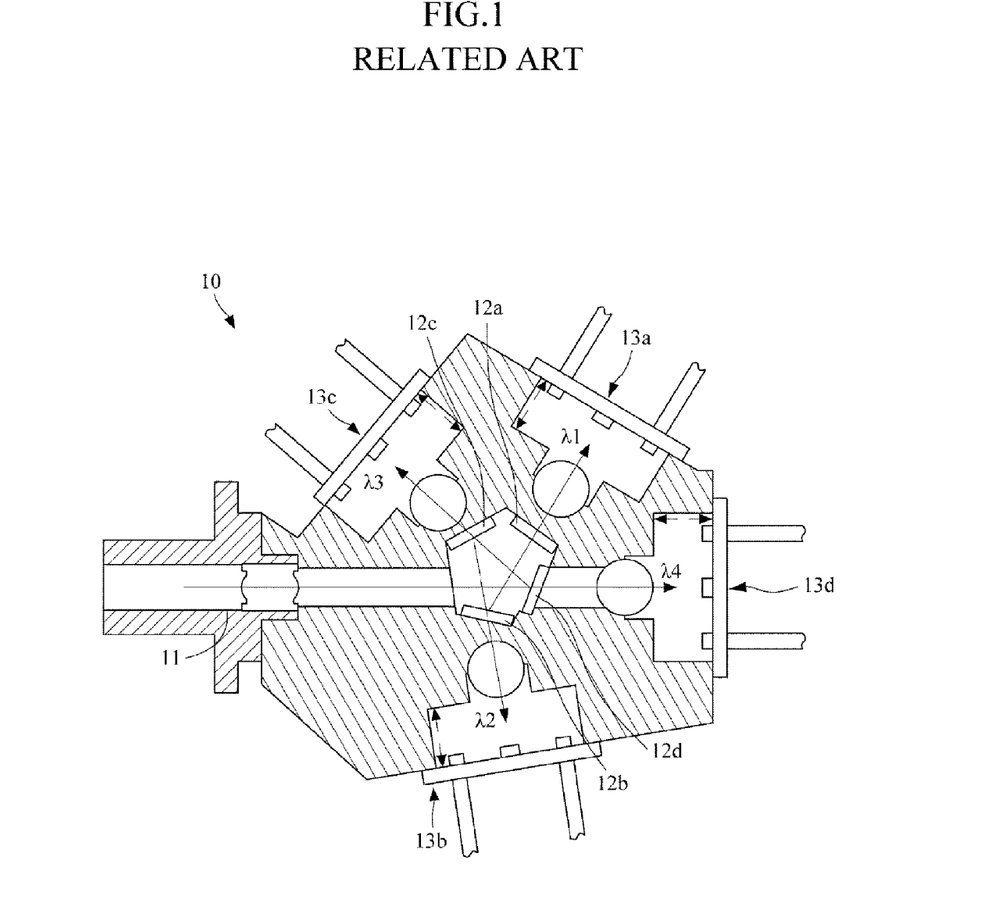
FIG. 1 is a cross-sectional view of a conventional optical transmitting and receiving module.

FIG. 1 is a cross-sectional view of a conventional optical transmitting and receiving module 10 (disclosed in U.S. Patent Application No. 2004-971462).

Referring to FIG. 1, the optical transmitting and receiving module 10 is configured to have the function of the ROSA. When optical signals of multiple wavelengths are incident upon thin-film filters 12a through 12d, which are arranged in a pentagon, through a receptacle 11, each of the thin-film filters 12a through 12d allows only an optical signal having a corresponding wavelength to pass therethrough and reflects optical signals having the other wavelengths. Optical signals λ1, λ2, λ3, and λ4 that pass through the thin-film filters 12a through 12d are input is to photodetector devices 13a through 13d and are there converted into electrical signals.

If the optical transmitting and receiving module 10 is configured to have the function of the TOSA, the photodetector devices 13a through 13d may be replaced by laser diode devices. In this case, optical signals of multiple wavelengths may be output from the laser diodes. When the optical signals output from the laser diodes are input to the thin-film filters 12a through 12d, each of the thin-film filters 12a through 12d may allow only an optical signal having a corresponding wavelength to pass therethrough and reflect optical signals having the other wavelengths. The reflected optical signals may be output through the receptacle 11.

In the optical transmitting and receiving module 10 structured as described above, parts to or from which electrical signals are input or output are scattered over multiple locations and in multiple directions. Thus, it may be very difficult to design an electrical signal interface and reduce the size of the optical transmitting and receiving module 10.

Figure 2:
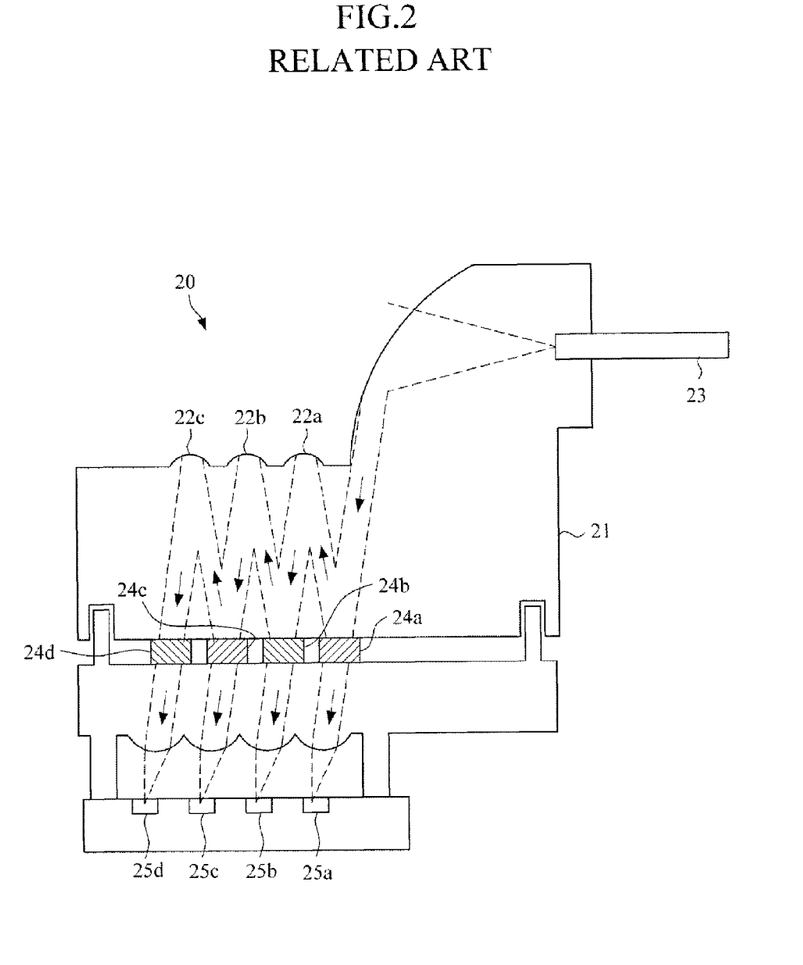
FIG. 2 is a cross-sectional view of another conventional optical transmitting and receiving module.

FIG. 2 is a cross-sectional view of another conventional optical transmitting and receiving module 20 (disclosed in U.S. Pat. No. 6,198,864).

Referring to FIG. 2, the optical transmitting and receiving module 20 is configured to have the function of the ROSA. A series of concave relay mirrors 22a through 22c are integrated into an optical block 21. When optical signals of multiple wavelengths are incident upon the optical block 21 through an optical fiber 23, each of filters 24a through 24d allows only an optical signal having a corresponding wavelength to pass therethrough and reflects optical signals having the other wavelengths. The optical signals propagate while this process is repeated. The optical signals that sequentially pass through the filters 24a through 24d are input to photodiodes 25a through 25d and are there converted into electrical signals. Light reflected by the filters 24a through 24d is continuously focused by the relay mirrors 22a through 22c.

For single-mode reception, a light-receiving region of a photodiode is tens of μm in diameter. For single-mode transmission, a diameter of a core of an optical fiber is approximately 8 μm. Thus, the presence of a manufacturing error in the optical transmitting and receiving module 20 may result in a large loss of optical signals. In addition, since the optical transmitting and receiving module 20 using the relay mirrors 22a through 22c has a lower alignment tolerance than an optical transmitting and receiving module using lenses, a significant alignment-related optical loss may occur, thereby deteriorating mass productivity.

SUMMARY

The following description relates to multi-wavelength optical transmitting and receiving modules which can be modularized and reduced in size due to an optical signal input/output connector and an electrical signal input/output connector being arranged in a straight line.

The following description also relates to multi-wavelength optical transmitting and receiving modules which have high tolerance for alignment of multi-wavelength channels, allow the multi-wavelength channels to be easily aligned, and have high production yields and, ultimately, high mass productivity.

In one general aspect, there is provided a multi-wavelength optical transmitting module including: a housing having a first coupling hole and a second coupling hole respectively formed in opposite surfaces thereof; an optical output block coupled to the first coupling hole of the housing, connected to an optical signal connector, and including a first lens; an optical transmitting block coupled to the second coupling hole of the housing, connected to an electrical signal connector, and comprising a plurality of transmitting devices which respectively output light having different wavelengths and are arranged parallel to the optical output block, and a plurality of second lenses which are arranged on a light output side of the transmitting devices to correspond respectively to the transmitting devices; and an optical multiplexer (MUX) block disposed within the housing, multiplexing optical signals of multiple wavelengths, which were output from the transmitting devices and pass through the second lenses, and transmitting the multiplexed optical signals to the optical output block.

In another aspect, there is provided a multi-wavelength optical receiving module including: a housing having a first coupling hole and a second coupling hole respectively formed in opposite surfaces thereof; an optical input block coupled to the first coupling hole of the housing, connected to an optical signal connector, and including a first lens; an optical receiving block coupled to the second coupling hole of the housing, connected to an electrical signal connector, and including a plurality of receiving devices which respectively receive optical signals having different wavelengths and are arranged parallel to the optical input block, and a plurality of second lenses which are arranged on a light input side of the receiving devices to correspond respectively to the receiving devices; and an optical demultiplexer (DEMUX) block disposed within the housing, demultiplexing multiplexed optical signals of multiple wavelengths, which were received from the optical input block and pass through the first lens, and transmitting the demultiplexed optical signals to the receiving devices.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The above and other features and advantages of the present invention will become more apparent by describing exemplary embodiments thereof with reference to the attached drawings.

Figure 3:
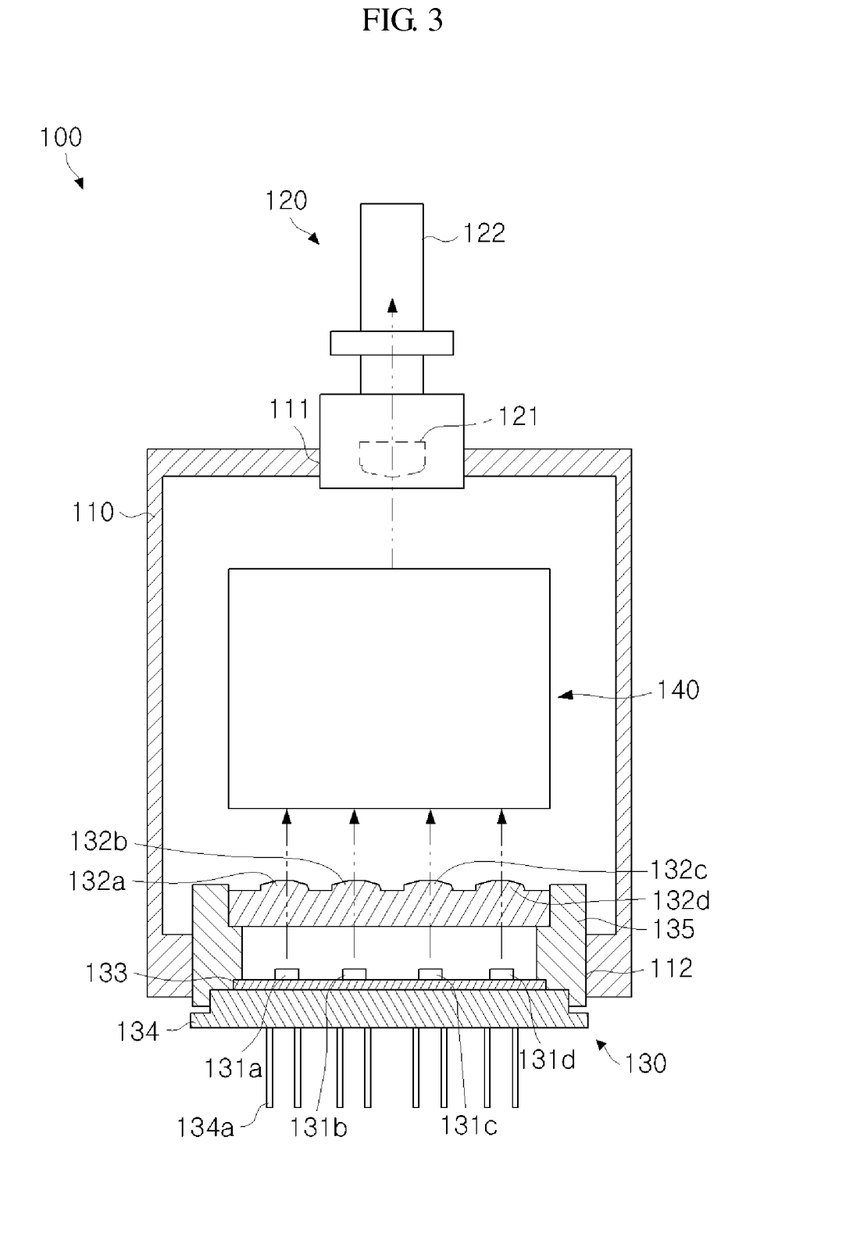
FIG. 3 is a cross-sectional view of an exemplary multi-wavelength optical transmitting module.

FIG. 3 is a cross-sectional view of an exemplary multi-wavelength optical transmitting module 100. Referring to FIG. 3, the multi-wavelength optical transmitting module 100 includes a housing 110, an optical output block 120, an optical transmitting block 130, and an optical multiplexer (MUX) block 140.

The housing 110 includes space therein, and a first coupling hole 111 and a second coupling hole 112 are respectively formed in opposite surfaces of the housing 110. The optical output block 120 is coupled to the first coupling hole 111, and the optical transmitting block 130 is coupled to the second coupling hole 112. The first and second coupling holes 111 and 112 may be large enough to respectively allow the optical output block 120 and the optical transmitting block 130 to be partially inserted thereinto.

The optical output block 120 is connected to an optical signal connector and is coupled to the first coupling hole 111 of the housing 110. Here, part of the optical output block 120 may be inserted into the first coupling hole 111. A first lens 121 is built in the optical output block 120. The first lens 121 allows optical signals multiplexed by the optical MUX block 140 to pass therethrough so that the optical signals can reach the optical signal connector.

The optical transmitting block 130 is connected to an electrical signal connector and is coupled to the second coupling hole 112 of the housing 110. Here, part of the optical transmitting block 130 may be inserted into the second coupling hole 112. The optical transmitting block 130 includes a plurality of transmitting devices 131a through 131d and a plurality of second lenses 132a through 132d.

The transmitting devices 131a through 131d receive electrical signal data for multi-wavelength transmission from the electrical signal connector and respectively output optical signals having different wavelengths. The transmitting devices 131a through 131d may be laser diodes which oscillate optical signals having different wavelengths. The transmitting devices 131a through 131d are arranged in a line to be parallel to the optical output block 120.

The second lenses 132a through 132d are arranged on the light output side of the transmitting devices 131a through 131d to correspond respectively to the transmitting devices 131a through 131d. The second lenses 132a through 132d may be separated from the transmitting devices 131a through 131d by a predetermined gap, and optical axes of the second lenses 132a through 132d may match output axes of the transmitting devices 131a through 131d, respectively.

The optical MUX block 140 is disposed within the housing 110 and between the optical output block 120 and the optical transmitting block 130. The optical MUX block 140 multiplexes optical signals of multiple wavelengths, which were output from the transmitting devices 131a through 131d and passed through the second lenses 132a through 132d, and transmit the multiplexed optical signals to the optical output block 120.

In the multi-wavelength optical transmitting module 100 configured as described above, the optical signal connector connected to the optical output block 120 and the electrical signal connector connected to the optical transmitting block 130 can be arranged in a straight line. Thus, the multi-wavelength optical transmitting module 100 can be easily designed and manufactured, which, in turn, contributes to modularization of the multi-wavelength optical transmitting module 100. In addition, since the transmitting devices 131a through 131d and the second lenses 132a through 132d form an array, the size of the optical transmitting block 130 can be reduced, resulting in a reduction in size of the multi-wavelength optical transmitting module 100.

Furthermore, the optical output block 120, the optical transmitting block 130, and the optical MUX block 130 can be manufactured and tested independently and then aligned on a block-by-block basis, thereby increasing production yields.

The optical output block 120 may be connected to the optical signal connector in the form of a receptacle 122. Here, the optical signal connector may be of a lucent cable (LC) type or a single coupling (SC) type. Although not shown in the drawing, the optical output block 120 may also be connected to the optical signal connector in the form of a fiber optic pigtail, instead of the receptacle 122. An optical isolator may be added to the optical output block 120 in order to reduce the effect of reflected light when the optical output block 120 is coupled to an optical fiber.

The optical transmitting block 130 may include a submount 133, a transistor outline (TO) stem 134, a lens cap 135, and an alignment mark (not shown). An array of the transmitting devices 131a through 131d are mounted on a surface of the submount 133 which faces the second lenses 132a through 132d. The TO stem 134 is manufactured by a TO process. The TO stem 134 is mounted on a lower surface of the submount 133, wherein the upper surface is the surface of the submount 133 which faces the second lenses 132a through 132d, and the TO stem is connected to the electrical signal connector. The TO stem 134 includes lead pins 134a for connection with the electrical signal connector. The lead pins 134a are disposed outside the housing 110.

The lens cap 135 is interposed between the second lenses 132a through 132d and the transmitting devices 131a through 131d and supports the second lenses 132a through 132d at a position determined according to focal length. The second lenses 132a through 132d may be arranged as a single piece. In this case, a surface of the lens cap 135, which faces the optical MUX block 140, may be recessed to accommodate and support the second lenses 132a through 132d arranged as a single piece. The lens cap 135 may be structured such that it can be joined with the submount 133 and the TO stem 134. Accordingly, the lens cap 135 may fix the second lenses 132a through 132d in place while aligning respective focal lengths between the transmitting devices 131a through 131d and the second lenses 132a through 132d.

The alignment mark is used to align the transmitting devices 131a through 131d with the second lenses 132a through 132d. That is, the alignment mark may be used to perfectly match the output axes of the transmitting devices 131a through 131d and the optical axes of the second lenses 132a through 132d. The alignment mark may be formed in each of the submount 133 and the second lenses 132a through 132d.

In the optical transmitting block 130, a flexible printed circuit board (PCB) may be mounted on the lead pins 134a. In addition, a monitoring optical device for monitoring the intensity of light of the transmitting devices 131a through 131d may be added to the optical transmitting block 130. When the transmitting devices 131a through 131d are vertical-cavity surface-emitting lasers (VCSELs), a reflective plate may be interposed between the transmitting devices 131a through 131d and the second lenses 132a through 132d to reflect part of output light. When the transmitting devices 131a through 131d are electro-absorption modulated lasers (EMLs), a thermo-electric cooler (TEC) may be added to maintain a predetermined temperature.

Figure 4:
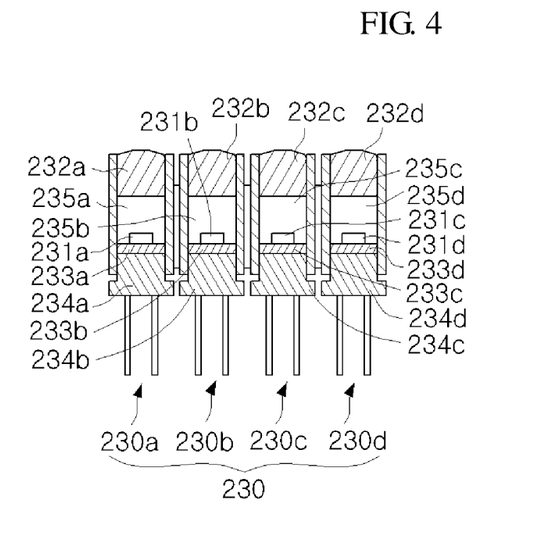
FIG. 4 is a cross-sectional view of a first modified example of an optical transmitting block shown in FIG. 3.

FIG. 4 is a cross-sectional view of a first modified example of the optical transmitting block 130 shown in FIG. 3. Referring to FIG. 4, an optical transmitting block 230 includes a plurality of optical transmitting subblocks 230a through 230d which are separated from each other to correspond respectively to different optical wavelength channels. That is, the optical transmitting subblocks 230a through 230d respectively include transmitting devices 231a through 231d which output optical signals having different wavelengths. In addition, the optical transmitting subblocks 230a through 230d respectively include second lenses 232a through 232d, submounts 233a through 233d, TO stems 234a through 234d, and lens caps 235a through 235d.

When the optical transmitting block 230 includes the optical transmitting subblocks 230a through 230d in the form of independent channels as described above, each channel can be easily manufactured by a TO process. In addition, since each channel can be aligned independently, the alignment process can be performed easily, and an optical loss for each channel can be minimized. Furthermore, since each channel is manufactured separately, a defect rate can be reduced, thereby improving mass productivity.

Figure 5:
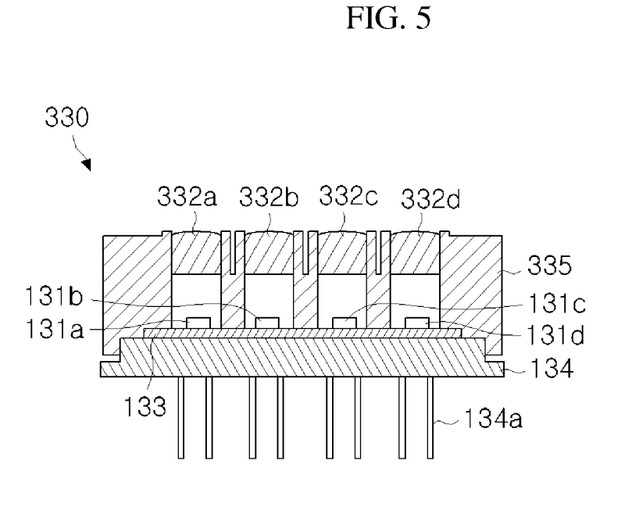
FIG. 5 is a cross-sectional view of a second modified example of the optical transmitting is block shown in FIG. 3.

FIG. 5 is a cross-sectional view of a second modified example of the optical transmitting block 130 shown in FIG. 3. Referring to FIG. 5, an optical transmitting block 330 includes a plurality of second lenses 332a through 332d. While the second lenses 132a through 132d included in the optical transmitting block 130 of FIG. 3 are arranged as a single piece, the second lenses 332a through 332s are separated from each other. That is, the second lenses 332a through 332d are separated from each other to correspond respectively to transmitting devices 131a through 131d. Here, a lens cap 335 may be configured to support the second lenses 332a through 332d such that the second lenses 332a through 332d remain separated from each other.

Figure 6A:
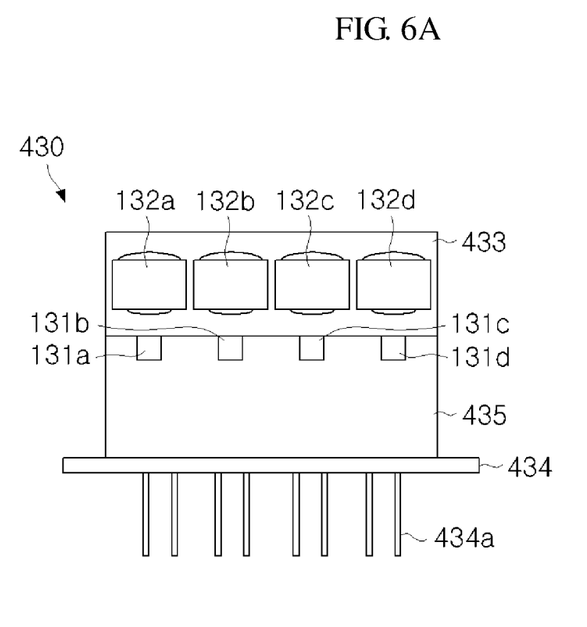
FIGS. 6A and 6B are top cross-sectional and lateral cross-sectional views of a third modified example of the optical transmitting block shown in FIG. 3.
Figure 6B:
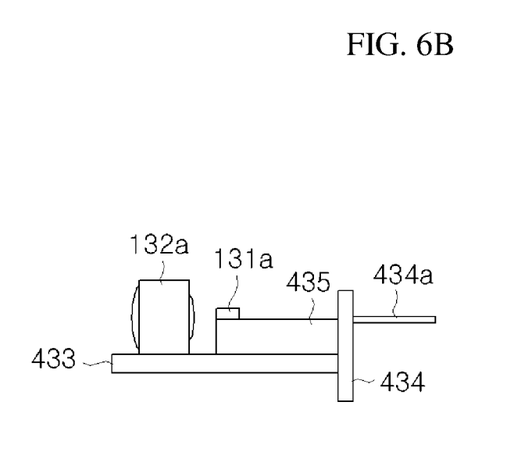

FIGS. 6A and 6B are top cross-sectional and lateral cross-sectional views of a third modified example of the optical transmitting block 130 shown in FIG. 3. Referring to FIGS. 6A and 6B, an optical transmitting block 430 includes a submount 433 and a metal wall 434. A plurality of second lenses 132a through 132d and a plurality of transmitting devices 131a through 131d are mounted on the submount 433. Here, the submount 433 may be made of metal. The transmitting devices 131a through 131d may be mounted on a ceramic plate 435, which is stacked on the submount 433, to correspond respectively to optical axes of the second lenses 132a through 132d. The ceramic plate 435 may be made of aluminum oxide or aluminum nitride.

The metal wall 434 is mounted on a side of the submount 433 and is connected to an electrical signal connector. The metal wall 434 includes lead pins 434a for connection with the electrical signal connector. The lead pins 434a are disposed outside the housing 110. The lead pins 434a may be connected to the transmitting devices 131a through 131d by wire bonding.

The optical transmitting block 430 using the metal wall 434 as described above can be applied in a higher-speed electrical signal interface than the optical transmitting block 130 using the TO stem 134.

Figure 7:
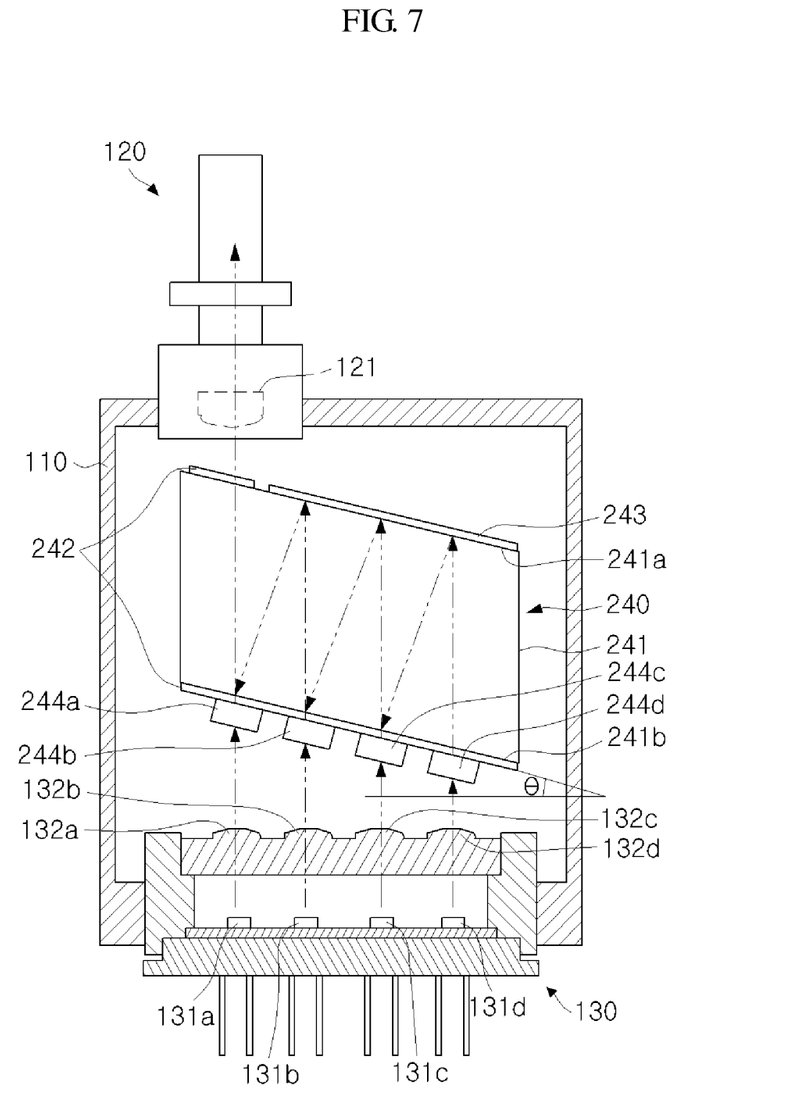
FIG. 7 is a cross-sectional view of the multi-wavelength optical transmitting module of FIG. 3 which employs an exemplary optical multiplexer (MUX) block.

FIG. 7 is a cross-sectional view of the multi-wavelength optical transmitting module 100 of FIG. 3 which employs an exemplary optical MUX block 240.

Referring to FIG. 7, the optical MUX block 240 may be inclined at a predetermined angle θ to the optical transmitting block 130 such that the gap between the first lens 121 and one (i.e., the transmitting device 131a) of the transmitting devices 131a through 131d, which faces the first lens 121, is larger than the gaps between the first lens 121 and the other transmitting devices 131b through 131d. Accordingly, optical signals output from the transmitting devices 131b is through 131d may be guided to the optical output block 120. In this case, the optical output block 120 and the optical transmitting block 130 may be coupled to the housing 110 such that the first lens 121 faces an outermost one of the transmitting devices 131a through 131d.

The optical MUX block 240 may include a transparent body 241, an anti-reflecting layer 242, a totally reflecting layer 243, and thin-film filters 244a through 244d. The transparent body 241 is made of a transparent material to allow light to pass therethrough. The transparent body 241 includes a first inclined surface 241a which faces the optical output block 120 and whose one end is closer to the first lens 121 than the other end. In addition, the transparent body 241 includes a second inclined surface 241b which faces the optical transmitting block 130 and is parallel to the first inclined surface 241a. Accordingly, the transparent body 241 is inclined at the predetermined angle θ to the optical transmitting block 130.

The anti-reflecting layer 242 is formed in a region of the first inclined surface 241a which corresponds to the first lens 121, and the totally reflecting layer 243 is formed in the other regions of the first inclined surface 241a. Accordingly, optical signals entering the transparent body 241 may pass through only the region of the first inclined surface 241a, in which the anti-reflecting layer 242 is formed, to be incident upon the first lens 121.

The anti-reflecting layer 242 is formed in the entire region of the second inclined surface 241b. This is to allow optical signals, which passed through the thin-film filters 244a through 244d, to travel through the second inclined surface 241b and then enter the transparent body 241.

When receiving optical signals of multiple wavelengths from the transmitting devices 131a through 131d, each of the thin-film filters 244a through 244d allows only an optical signal having a corresponding wavelength to pass therethrough and reflects optical signals having the other wavelengths. The thin-film filters 244a through 244d are disposed on the second inclined surface 241b to correspond respectively to the transmitting devices 131a through 131d and allow optical signals having wavelengths output from the transmitting devices 131a through 131d to pass therethrough, respectively.

In operation of the multi-wavelength optical transmitting module 100 employing the above-described optical MUX block 240, when electrical signal data for multi-wavelength transmission is input to the transmitting devices 131a through 131d through the electrical signal connector, the transmitting devices 131a through 131d perform electrical-optical conversion. Accordingly, optical signals having different wavelengths are output from the transmitting devices 131a through 131d according to output wavelengths of the transmitting devices 131a through 131d, respectively. Then, the optical signals are input to the thin-film filters 244a through 244d via the second lenses 132a through 132d. If the second lenses 132a through 132d are collimating lenses, the optical signals may be converted into collimated light, and the collimated light may be incident upon the thin-film filters 244a through 244d.

Next, each of the thin-film filters 244a through 244d allows an optical signal having a wavelength output only from a corresponding one of the transmitting devices 131a through 131d to pass therethrough. The optical signals that respectively pass through the thin-film filters 244a through 244d travel through the anti-reflecting layer 242 of the second inclined surface 241b and then enter the transparent body 241. Here, an optical signal that passes through the thin-film filter 244a, which is the leftmost one of the thin-film filters 244a through 244d, proceeds straight to the anti-reflecting layer 242 of the first inclined surface 241a. On the other hand, optical signals that pass through the other thin-film filters 244b through 244d proceed to the anti-reflecting layer 242 of the first inclined surface 241a while being reflected by the totally reflecting layer 243 and the thin-film filters 244b through 244d in a zigzag fashion. Eventually, the optical signals of multiple wavelengths are multiplexed and then propagate through the anti-reflecting layer 242 of the first inclined surface 241a. Then, the multiplexed optical signals pass through the first lens 121 and the receptacle 122 to be coupled to a core of an optical fiber.

Figure 8:
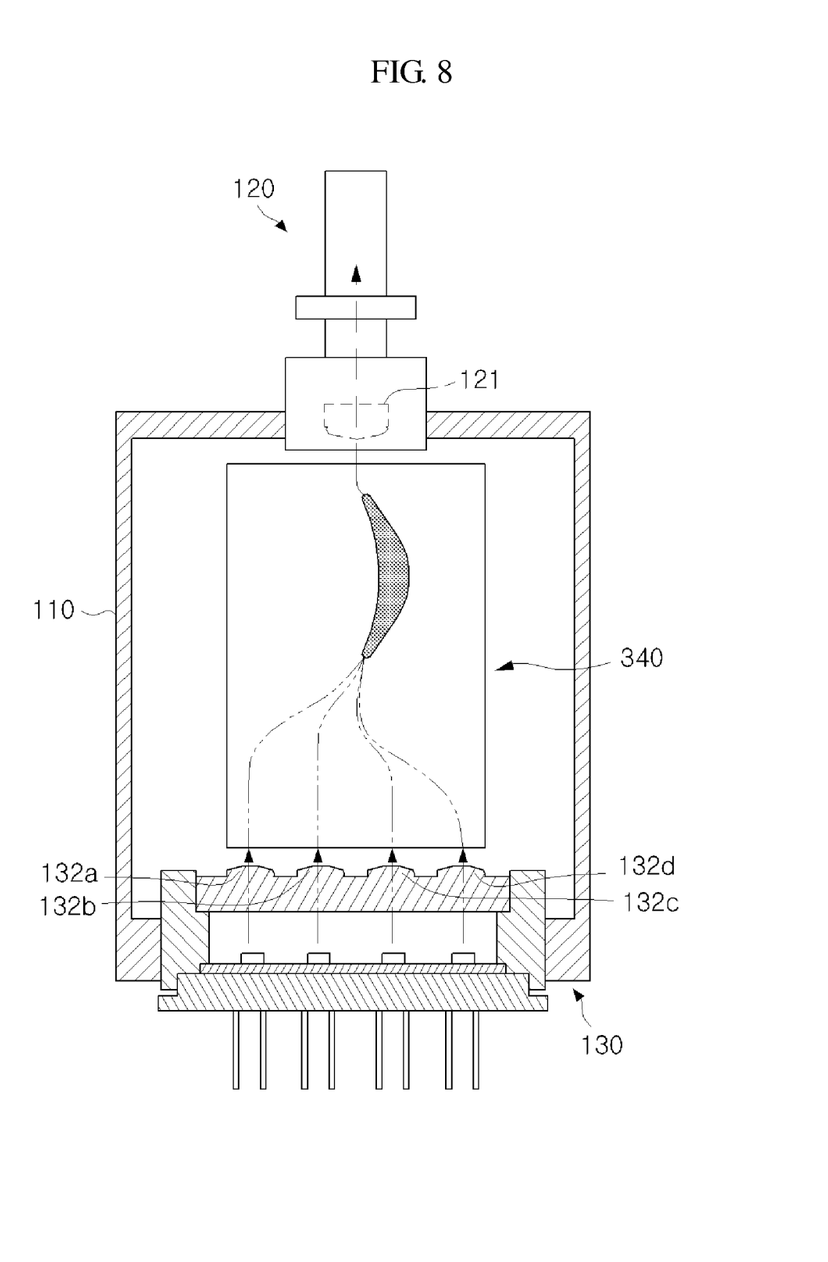
FIG. 8 is a cross-sectional view of the multi-wavelength optical transmitting module of FIG. 3 which employs another exemplary optical MUX block.

FIG. 8 is a cross-sectional view of the multi-wavelength optical transmitting module 100 of FIG. 3 which employs another exemplary optical MUX block 340.

Referring to FIG. 8, the optical MUX block 340 may be a planar lightwave circuit (PLC) device. The PLC device may be made of silica or silicon to allow light to pass therethrough and to guide the light.

The PLC device may be an arrayed waveguide grating (AWG) or a grating filter which splits or couples optical wavelengths. Alternatively, the PLC device may be a splitter or coupler which splits or couples optical power. The first lens 121 of the optical output block 120 and the second lenses 132a through 132d of the optical transmitting block 130 may be coupling lenses, instead of collimating lenses.

In the operation of the multi-wavelength optical transmitting module 100 employing the above-described optical MUX block 340, when electrical signal data for multi-wavelength transmission is input to the transmitting devices 131a through 131d through the electrical signal connector, the transmitting devices 131a through 131d perform electrical-optical conversion. Accordingly, optical signals having different wavelengths are output from the transmitting devices 131a through 131d according to output wavelengths of the transmitting devices 131a through 131d. Then, the output optical signals respectively pass through the second lenses 132a through 132d to be coupled and thus input to a waveguide core of the optical MUX block 340. Next, the optical signals of multiple wavelengths are multiplexed, and the multiplexed optical signals propagate through the first lens 121 and a receptacle 122 to be coupled to a core of an optical fiber.

Figure 9:
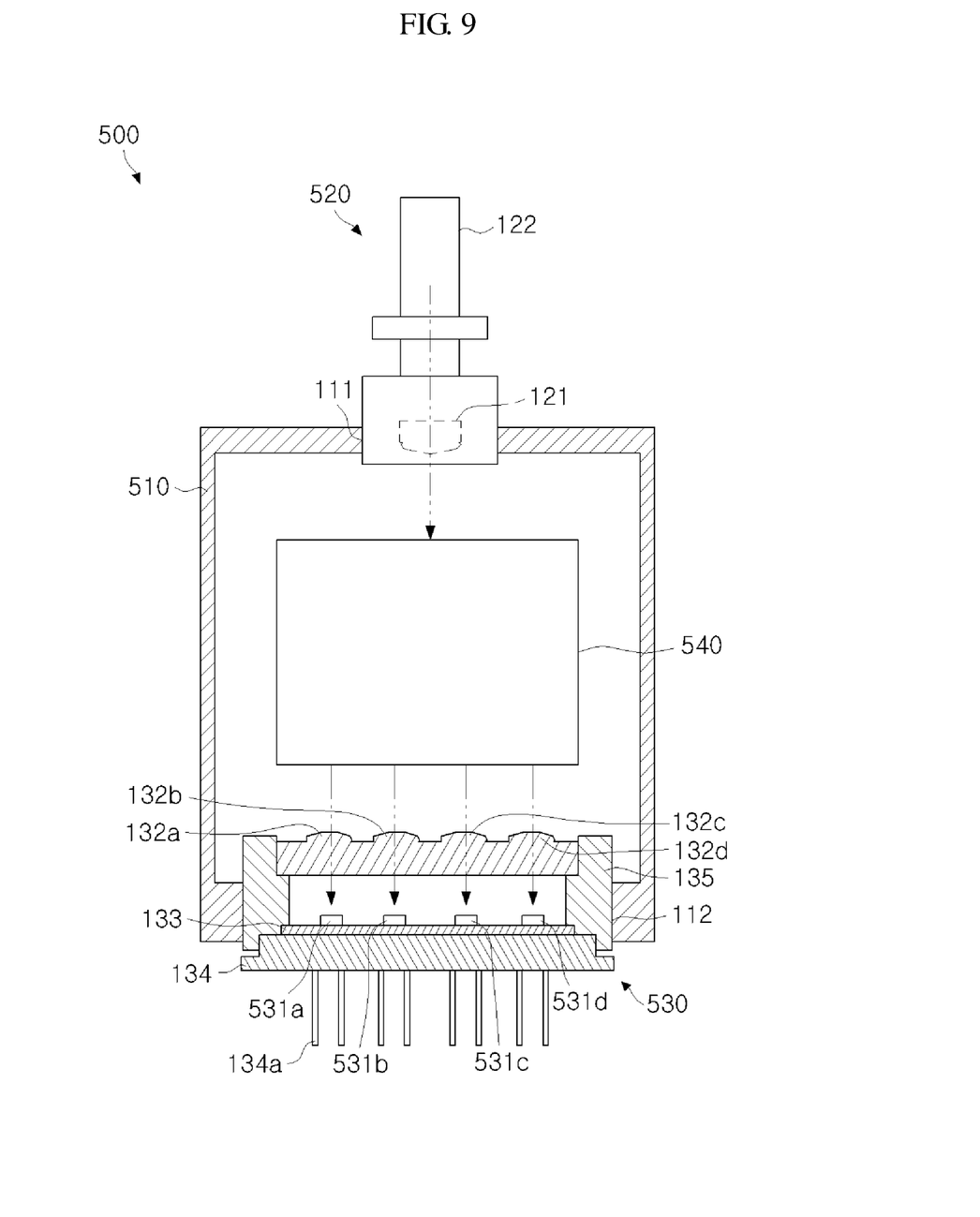
FIG. 9 is a cross-sectional view of an exemplary multi-wavelength optical receiving module.

FIG. 9 is a cross-sectional view of an exemplary multi-wavelength optical receiving module 500. Referring to FIG. 9, the multi-wavelength optical receiving module 500 includes a housing 510, an optical input block 520, an optical receiving block 530, and an optical demultiplexer (DEMUX) block 540. The multi-wavelength optical receiving module 500 has substantially the same structure as the above-described multi-wavelength optical transmitting module 100 except that the transmitting devices 131a through 131d are replaced by receiving is devices 531a through 531d.

The receiving devices 531a through 531d respectively receive optical signals having different wavelengths and output the received optical signals to an electrical signal connector. The receiving devices 531a through 531d may be photodiodes which receive optical signals having different wavelengths. The optical input block 520 receives multiplexed optical signals of multiple wavelengths. The optical DEMUX block 530 receives the multiplexed optical signals of multiple wavelengths from the optical input block 520, demultiplexes the received optical signals, and transmits the demultiplexed optical signals to the receiving devices 531a through 531d.

Like the above-described multi-wavelength optical transmitting module 100, the multi-wavelength optical receiving module 500 can be easily designed and manufactured, which, in turn, contributes to modularization and reduction in size of the multi-wavelength optical receiving module 500. Furthermore, the optical input block 520, the optical receiving block 530, and the optical DEMUX block 540 can be manufactured and tested independently and then aligned on a block-by-block basis, thereby improving production yields.

The optical receiving block 530 may have substantially the same structure as the optical transmitting blocks 230, 330, and 430 shown in FIGS. 4 through 6 except that the transmitting devices 131*a* through 131*d* are replaced by the receiving devices 531*a* through 531*d*.

Also, the optical DEMUX block 540 may have substantially the same structure as the optical MUX blocks 240 and 340 shown in FIGS. 7 and 8 except that it demultiplexes multiplexed optical signals of multiple wavelengths when receiving the multiplexed optical signals from the optical input block 520.

Figure 10:
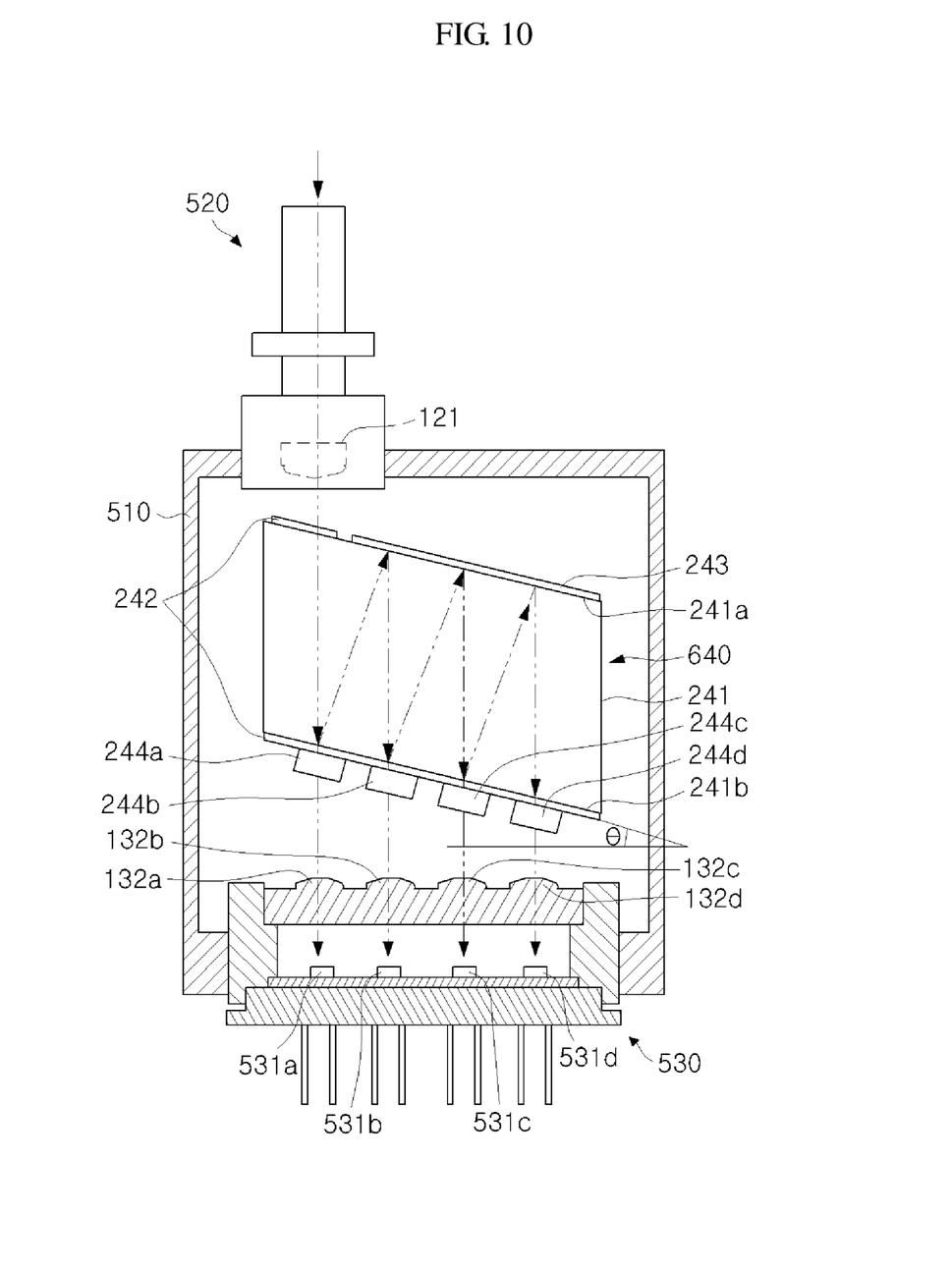
FIG. 10 is a cross-sectional view of the multi-wavelength optical receiving module of FIG. 9 which employs an exemplary optical demultiplexer (DEMUX) block.

FIG. 10 is a cross-sectional view of the multi-wavelength optical receiving module 500 of FIG. 9 which employs an exemplary optical DEMUX block 640. Here, the optical DEMUX block 640 has substantially the same structure as the optical MUX block 240 of FIG. 7. In the operation of the multi-wavelength optical receiving module 500, multiplexed optical signals of multiple wavelengths are input to the optical input block 520 through an optical signal connector. Then, the optical signals pass through a first lens 121 and an anti-reflecting layer 242 of a first inclined surface 241*a* to enter a transparent body 241. On entering the transparent body 241, the optical signals proceed to the leftmost one of thin-film filters 244*a* through 244*d*, that is, the thin-film filter 244*a*.

The thin-film filter 244*a* at the very left allows only an optical signal having a corresponding wavelength to pass therethrough and reflects the other optical signals. The reflected optical signals are reflected again by a totally reflecting layer 243 and the thin-film filters 244*b* and 244*c* in a zigzag fashion. In this process, each of the thin-film filters 244*b* through 244*d* allows only an optical signal having a corresponding wavelength to pass therethrough. Eventually, the optical signals of multiple wavelengths are demultiplexed and then transmitted through the anti-reflecting layer 242 of a second inclined surface 241*b*. Next, the demultiplexed optical signals are input to the receiving devices 531*a* through 531*d* via second lenses 132*a* through 132*d*. The receiving devices 531*a* through 531*d* convert the optical signals into electrical signals and output the electrical signals to the electrical signal connector.

According to the present invention, an optical signal connector and an electrical signal connector can be arranged in a straight line. Thus, a multi-wavelength optical transmitting module can be easily designed and manufactured, which, in turn, contributes to modularization of the multi-wavelength optical transmitting module. In addition, since transmitting devices and second lenses included in an optical transmitting block form an array, the size of the optical transmitting block can be reduced, resulting in a reduction in size of the multi-wavelength optical transmitting module 100.

According to the present invention, an optical output block, an optical transmitting block, and an optical MUX block can be manufactured and tested independently and then aligned on a block-by-block basis, thereby increasing production yields.

According to the present invention, when an optical transmitting/receiving block includes is a plurality of optical transmitting/receiving subblocks in the form of independent channels, each channel can be easily manufactured by a TO process. In addition, since each channel can be aligned independently, the alignment process can be performed easily, and an optical loss for each channel can be minimized. Furthermore, since each channel is manufactured separately, a defect rate can be reduced, thereby improving mass productivity.

While this invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims.

What is claimed is:

1. A multi-wavelength optical transmitting module comprising:
    a housing having a first coupling hole and a second coupling hole respectively formed in opposite surfaces thereof;
    an optical output block coupled to the first coupling hole of the housing, connected to an optical signal connector, and comprising a first lens;
    an optical transmitting block coupled to the second coupling hole of the housing, connected to an electrical signal connector, and comprising a plurality of transmitting devices which respectively output light having different wavelengths and are arranged parallel to the optical output block, and a plurality of second lenses which are arranged on a light output side of the transmitting devices to correspond respectively to the transmitting devices; and
    an optical multiplexer (MUX) block disposed within the housing, multiplexing optical signals of multiple wavelengths, which were output from the transmitting devices and pass through the second lenses, and transmitting the multiplexed optical signals to the optical output block;
    wherein the optical output block and the optical transmitting block are coupled to the housing such that the first lens faces an outermost one of the transmitting devices, and the optical MUX block comprises:
    a transparent body having a first inclined surface, which faces the optical output block and one end thereof is closer to the first lens than the other end, and having a second inclined surface which faces the optical transmitting block and is parallel to the first inclined surface;
    an anti-reflecting layer formed in a region of the first inclined surface, which corresponds to the first lens, and is formed in the entire region of the second inclined surface;
    a totally reflecting layer formed in the other regions of the first inclined surface; and
    thin-film filters, each receiving optical signals of multiple wavelengths from the transmitting devices, allowing an optical signal having a corresponding wavelength to pass therethrough, and reflecting optical signals having the other wavelengths.

2. The multi-wavelength optical transmitting module of claim 1, wherein the first and second lenses are collimating lenses.

3. The multi-wavelength optical transmitting module of claim 1, wherein the optical transmitting block comprises:
    a submount having the transmitting devices mounted on a surface thereof which faces the second lenses;
    a transistor outline (TO) stem having lead pins, which are connected to the electrical signal connector, the TO being mounted on a surface of the submount which is opposite the surface thereof facing the second lenses;

a lens cap interposed between the second lenses and the transmitting devices and supporting the second lenses at a position determined according to focal length; and an alignment mark used to align the transmitting devices with the second lenses.

4. The multi-wavelength optical transmitting module of claim 1, wherein the optical output block is connected to the optical signal connector in the form of a receptacle or a fiber optic pigtail.

* * * * *